June 21, 1960     Y. T. SIHVONEN ET AL     2,942,184
VEHICLE ACCELEROMETER
Filed July 15, 1957
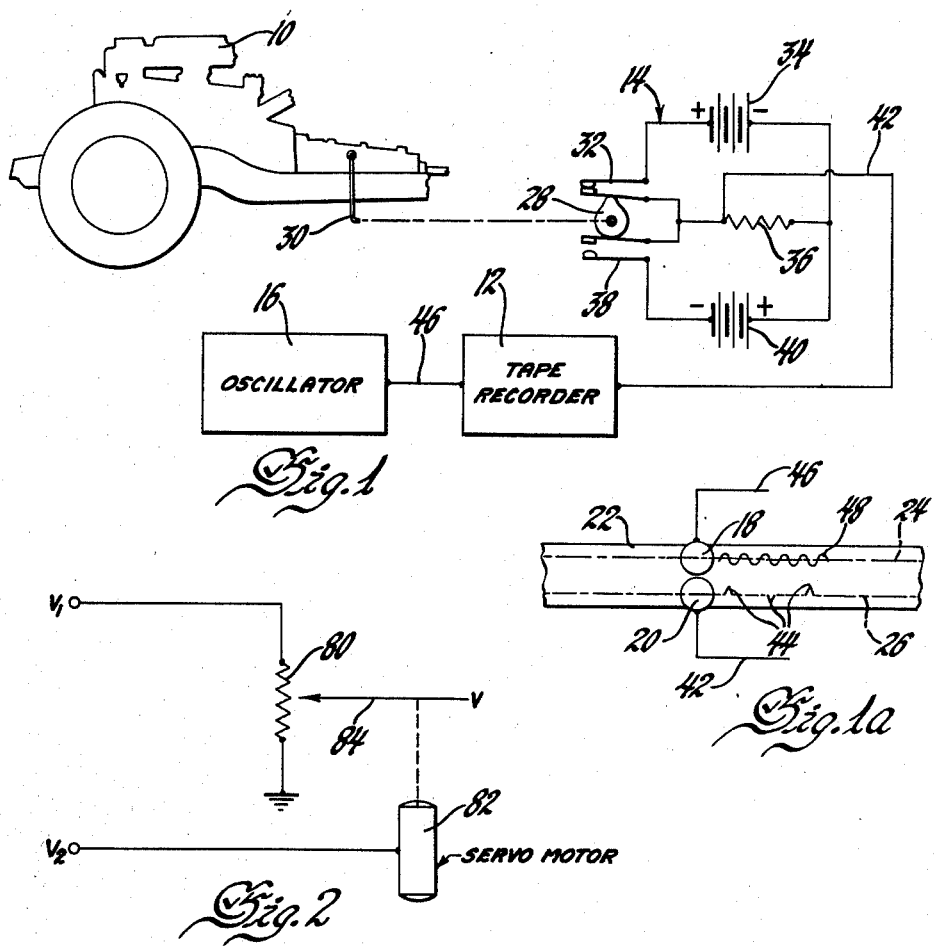
Fig. 1
Fig. 1a
Fig. 2
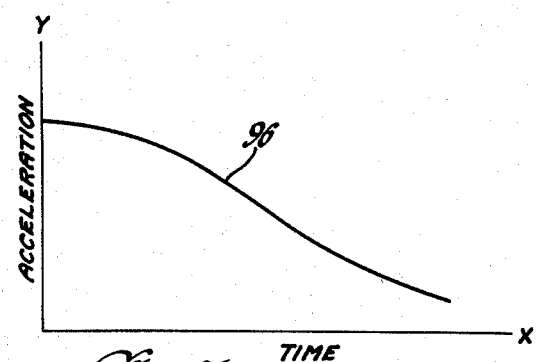
Fig. 3
INVENTORS
Yrjo T. Sihvonen &
James E. Wilson
BY E. W. Christen
ATTORNEY

United States Patent Office 2,942,184
Patented June 21, 1960

2,942,184

VEHICLE ACCELEROMETER

Yro T. Sihvonen, Birmingham, and James E. Wilson, St. Clair Shores, Mich., assignors to General Motors Corporation, Detroit, Mich., a corporation of Delaware Filed July 15, 1957, Ser. No. 671,858

6 Claims. (Cl. 324—70)

This invention relates to apparatus for measuring and recording the changes in velocity of a vehicle. More particularly, it relates to a system for recording acceleration data and for computing acceleration as a function of time.

In the testing of automotive vehicles and the like, it is often necessary to measure and record vehicle velocity changes. Such changes are commonly referred to as deceleration or acceleration depending upon the sense of change, but are referred to herein as accelerations which may be either positive or negative depending upon the sense of change. In many tests, it is important that the acceleration be measured with great accuracy over a considerable range of acceleration values. In accordance with this invention, data is measured and recorded which is directly related to the vehicle velocity and directly related to the elapsed time. Both of these quantities can be measured with great accuracy and when properly related permit computation of the acceleration value. To obtain the desired acceleration value, the data recording means is carried on the vehicle and data processing means is advantageously separate therefrom to reduce the bulk of the vehicle carried equipment. The data processing means is adapted for high speed computation of the desired acceleration values and the separation of the recording and processing means does not unduly delay the availability of the final results.

In a preferred embodiment, the acceleration data recording means comprises a two-channel magnetic tape recorder. A displacement signal generator responsive to vehicle displacement develops a signal at the beginning of each predetermined increment of vehicle displacement and supplies this signal to the input of one channel of the recorder. A timing signal generator develops a timing signal of known periodicity which is supplied to the input of the other channel of the recorder. This data is sufficient for computation of the average value of acceleration since the elapsed time corresponding to two successive increments of displacement will yield velocity information corresponding to each increment and the change in velocity for the total elapsed time yields acceleration information.

It is preferred to provide automatic computation of the acceleration value from the recorded data. For this purpose, the displacement signal generator is caused to develop displacement signals of different character corresponding to the beginning of two succeeding displacement increments. In the automatic processing of this data the timing signal corresponding to the first increment of displacement is separated from the timing signal corresponding to the second increment of displacement. This is suitably accomplished by gate circuits responsive to the displacement signals. Thus the elapsed time information for the first increment of displacement may be converted to a voltage by counting the cycles of the timing signals within the first increment. Similarly, elapsed time information is obtained corresponding to the second increment of displacement. By suitably combining the elapsed time signal voltages the acceleration value may be derived. At the same time the total elapsed time may be derived and hence the acceleration may be value plotted as a function of time.

A more complete understanding of this invention may be had from the detailed description which follows taken with the accompanying drawings in which:

Figure 1 is a diagrammatic representation of the acceleration data recording apparatus;

Figure 1a illustrates a feature of the recorder;

Figure 2 illustrates a suitable form of a multiplying circuit;

Figure 3 is a typical plot of acceleration as a function of time; and

Figure 4:
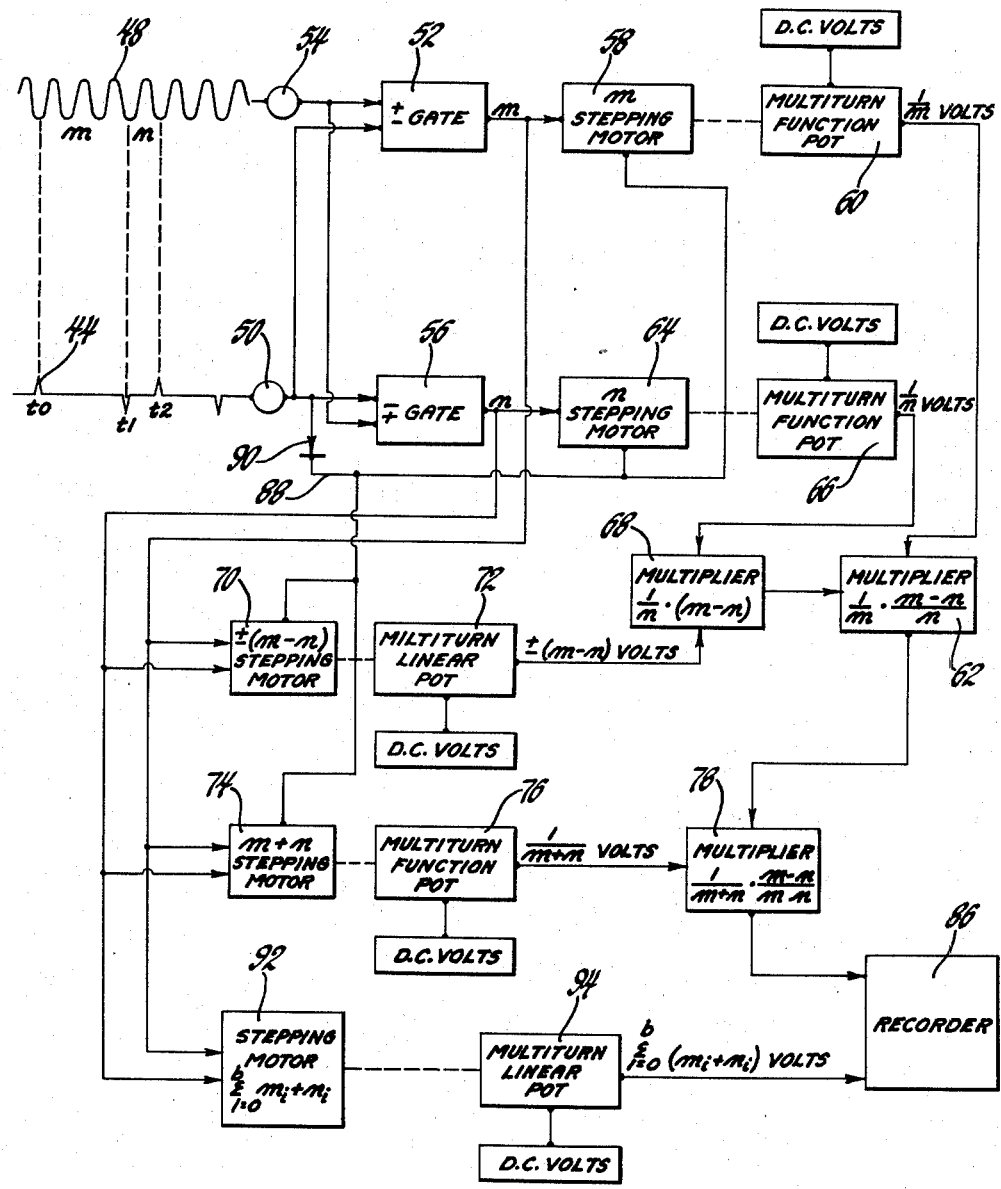
Figure 4 is a diagrammatic representation of the data processing apparatus.

Referring now to the drawings, there is shown an illustrative embodiment of the invention in an acceleration data recording and processing apparatus for deriving the recorded value of acceleration as a function of time for an automotive vehicle. The vehicle 10, which is subjected to varying acceleration, carries the data recording apparatus comprising the recorder 12, the displacement signal generator 14, and the timing signal generator or oscillator 16. The recorder 12 is preferably a conventional two-channel magnetic tape recorder. Such a recorder includes a fixed recording head 18 corresponding to one channel and a fixed recording head 20 corresponding to the other channel. The record medium or magnetic tape 22 is advanced at uniform velocity past the recording heads and includes a first signal channel 24 corresponding to recording head 18 and a second signal channel 26 corresponding to recording head 20.

The displacement signal generator 14 is adapted to develop a signal voltage at the beginning of each predetermined increment of displacement of the vehicle. Preferably, the displacement signal corresponding to the first increment of displacement is of different character from the displacement signal corresponding to the second increment of displacement so that the two signals may be distinguished from one another and so that successive cycles of displacement voltage are defined. This is suitably accomplished by utilizing a single lobe cam 28 which is rotatably driven from the vehicle transmission through a drive train 30 of appropriate gear reduction. One revolution of the cam 28 is thus directly related to a corresponding increment of vehicle displacement. Coacting with the cam 28 is a switch 32 serially connected with a voltage source 34, of the polarity indicated, and with the series resistor 36. Similarly, at a diametrically opposite position, the cam 28 coacts with a switch 38 which is serially connected with the voltage source 40, of the polarity indicated, and serially connected with the resistor 36. The output voltage of the displacement signal generator is derived across the resistor 36 and applied through conductor 42 to the recording head 20 of the recorder 12. This displacement signal 44, as illustrated in Figures 1a and 4, is a momentary impulse which occurs at the beginning of an increment of vehicle displacement corresponding to 180° rotation of the cam 28. The displacement signal corresponding to the first increment of displacement is of positive polarity and the displacement signal corresponding to the second increment of displacement is of negative polarity so that the first and second increments may be distinguished.

The timing signal generator 16 suitably takes the form of a conventional oscillator operated at a constant value of frequency. The frequency, for example, may be 1,000 cycles per second to provide a high degree of accuracy of acceleration measurement although it will appear hereinafter that a higher frequency requires longer time to process the data. Suitably a 60 cycle oscillator may be used without seriously impairing the accuracy of the measurement. The oscillator output voltage is connected by conductor 46 to the recording head 18 of the recorder 12. The timing signal 48 is suitably a sinusoidal voltage at the oscillator frequency.

The acceleration information is recorded continuously by the apparatus just described throughout the duration of the test run of the vehicle. This recorded data is sufficient to permit computation, either mentally or automatically, of vehicle acceleration as a function of time. It is apparent that the recorded data on the tape 22 may be reproduced by conventional means for visual examination and mental computation. It will also appear that this data may be processed automatically without such reproduction to compute the acceleration as a function of time. In either case it will be helpful to consider the derivation of the relationship between the acceleration value and the recorded data. The average value of acceleration may be expressed as $$\bar{a} = \frac{\text{change in velocity}}{\text{elapsed time}} = \frac{v}{t} \qquad (1)$$

The change of velocity between succeeding equal increments of displacement is given by $$v = \frac{w}{2(t2-t1)} - \frac{w}{2(t1-t0)} \qquad (2)$$

where $w=$ vehicle wheel circumference
$t1-t0=$ elapsed time for first increment of displacement corresponding to $w/2$.
$t2-t1=$ elapsed time for second increment of displacement corresponding to $w/2$.

The elapsed time required for the first and second increments of vehicle displacement is expressed by $$t = t2 - t0 \qquad (3)$$

Therefore, by substituting Equations 2 and 3 into Equation 1, the following expression for acceleration is obtained $$\bar{a} = \left[\frac{w}{2(t2-t1)} - \frac{w}{2(t1-t2)}\right]\frac{1}{t2-t0} \qquad (4)$$

By inspection of the recorded timing signal 48 and displacement signal 44, as shown in Figure 4, it is apparent that the elapsed time during the first increment of displacement is given by the expression $$t1 - t0 = \frac{m}{f} \qquad (5)$$

where $m=$ the number of cycles of the timing voltage between $t1$ and $t0$.
$f=$ the frequency of the timing voltage.

Likewise, the elapsed time during the second increment of displacement is given by $$t2 - t1 = \frac{n}{f} \qquad (6)$$

where $n=$ the number of cycles of the timing voltage between $t2$ and $t1$. The total elapsed time during the two succeeding increments of displacement is $$t2 - t0 = \frac{n+m}{f} \qquad (7)$$

These values, given by Equations 5, 6 and 7, may be substituted into Equation 4 and upon simplifying the resulting equation the following expression for acceleration is developed $$\bar{a} = k\frac{m-n}{m+n}\frac{1}{mn} \qquad (8)$$

where $$k = \frac{wf^2}{2}$$

It will also be apparent that the total elapsed time from the beginning to the end of the test run is given by the following expression $$t = \sum_{i=0}^{i=b}\frac{(m_i + n_i)}{f} \qquad (9)$$

where, $i=$ the number of the cycle of displacement voltage.
$b=$ the number of the final cycle of displacement voltage at the end of the test.

The foregoing Equations 8 and 9, which express the instantaneous value of acceleration and the value of total elapsed time in terms of the number of cycles of timing voltage, permit computation of these quantities. The recorded data is preferably processed automatically in accordance with these equations by the computer shown in Figure 4. In general, this computer operates to convert the recorded digital information into corresponding analog information which is then manipulated in accordance with Equations 8 and 9 to obtain the desired acceleration value as a function of time. The recorded displacement signal 44 is converted by the pick up or playback transducer 50 into a corresponding displacement voltage which is applied to the control circuit of gate 52. The recorded timing signal 48 is converted by the transducer 54 into a corresponding timing voltage which is applied to the signal input circuit of the gate 52. The gate 52 is of conventional design, suitably of the electron tube type, having an input electrode interposed between the output electrodes for translating the input signal to the output circuit and having a control electrode operative to block the translation of the input signal. The gate 52 is of the type which is operative upon the occurrence of a positive voltage on the control circuit to "open the gate" or translate the input signal and upon the occurrence of a negative voltage on the control circuit, to "close the gate" or block translation of the input signal. Thus gate 52 is opened by the displacement voltage $t0$ and remains open until the occurrence of the negative displacement signal $t1$, at which time it is closed. Accordingly, the timing signal 48 is passed through the gate 52 during this first increment of displacement and is blocked during the second increment of displacement corresponding to displacement signals $t1$ and $t2$. In a similar manner, the timing voltage 48 from the transducer 54 is applied to the input circuit of the gate 56 and the displacement voltage 44 from the transducer 50 is applied to the control circuit of the gate 56. Gate 56 is of the type in which the gate is opened by the occurrence of a negative voltage on the control circuit and is closed by the occurrence of a positive voltage on the control circuit. Thus, the timing voltage is blocked by the gate 56 during the first increment of displacement from $t0$ to $t1$ and is passed during the second increment of displacement from $t1$ to $t2$.

The output circuit of the gate 52 is coupled to a cycle counting means suitably in the form of a stepping motor 58. The stepping motor 58 responds to the timing voltage to produce a shaft rotation corresponding to the number of cycles $m$ of the timing voltage corresponding to the displacement $t0$ to $t1$. The output shaft of the stepping motor 58 drives a multi-turn function potentiometer 60 which is suitably excited with a source of direct voltage. The potentiometer 60 is adapted to develop a voltage corresponding to the reciprocal of its shaft rotation and thus a voltage $1/m$ is applied to one input circuit of the multiplier 62. In a similar manner, the output circuit of gate 56 is connected with the cycle counting means or stepping motor 64 which produces a shaft rotation proportional to the number of cycles $n$ of the timing voltage which occur during the displacement $t1$ to $t2$. The stepping motor 64 drives the multi-turn function potentiometer 66 which develops an output voltage $1/n$ corresponding to the reciprocal of the number of cycles of timing voltage occurring during the displacement of $t1$ to $t2$. This output voltage is applied to one input circuit of the multiplier 68. The output of gate 52 is also connected to one input circuit of the subtractor or stepping motor 70 and the output of gate 56 is connected to the other input circuit of the stepping motor 70. The stepping motor 70 is of the type adapted to rotate its shaft position in a forward direction proportional to the number of cycles of one input signal and in a reverse direction proportional to the number of cycles of another input signal. The stepping motor 70 thus produces a shaft rotation which displaces the multi-turn linear potentiometer 72 to produce an output voltage $(m-n)$ corresponding to the algebraic difference of the number of cycles in the first and second increments of displacement. This voltage $(m-n)$ is applied to the other input circuit of the multiplier 68. In a similar manner, the output of the gate 52 and the output of the gate 56 are applied to respective input circuits of the adder or stepping motor 74. The stepping motor 74 is of the type adapted to produce shaft rotation in the forward direction corresponding to the number of cycles of one input signal and to produce shaft rotation in the forward direction corresponding to the number of cycles of the other input signal and thus producing a total rotation corresponding to the algebraic sum. The stepping motor 74 drives the multi-turn function potentiometer 76 which produces an output voltage $$\left(\frac{1}{m+n}\right)$$

corresponding to the reciprocal of the input shaft rotation. This output voltage is applied to the other input circuit of the multiplier 78.

The multipliers 62, 68, and 78, previously mentioned, are suitably of a well known type as illustrated in Figure 2. This multiplier is adapted to produce an output voltage V proportional to the product of two input voltages V1 and V2. The voltage V1 is applied across a potentiometer resistor 80 and the voltage V2 is applied to the input circuit of a servomotor 82 adapted to produce shaft rotation proportional to the input voltage. The servomotor shaft is coupled to the potentiometer movable contact 84 for displacement thereof proportional to the voltage V2. Thus the output voltage V derived by the movable contact 84 corresponds to the product of the two input voltages.

In the multiplier 68 the voltage $$\left(\frac{1}{n}\right)$$

from the potentiometer 66 and the voltage $(m-n)$ from the potentiometer 72 are applied as the input voltages. Thus the output voltage $$\left(\frac{m-n}{n}\right)$$

is developed and applied to one input circuit of the multiplier 62. The voltage $$\left(\frac{1}{m}\right)$$

from the potentiometer 60 applied to the other input circuit of the multiplier 62 produces the output voltage $$\left(\frac{m-n}{mn}\right)$$

which is applied to one input circuit of the multiplier 78. The voltage $$\frac{1}{m+n}$$

from the potentiometer 76 is applied to the other input circuit of the multiplier 78 which develops the output voltage $$\left(\frac{1}{m+n}\right)\left(\frac{m-n}{mn}\right)$$

which corresponds to the instantaneous value of acceleration as expressed in Equation 8. This acceleration voltage is applied to the Y-axis input circuit of the X—Y recorder 86. To prepare the stepping motors 58, 64, 70, and 74 for the succeeding cycles or pairs of first and second increments of displacement data, there is provided a control circuit 88. This control circuit extends from the transducer 50 through a rectifying device 90 to the respective reset circuits of each of the stepping motors 58, 64, 70, and 74. The rectifying device 90 is operative to pass only the positive displacement signals which signify the initiation of each succeeding cycle or pair of first and second increments of displacement.

In order to continuously compute the total value of elapsed time from the commencement of the test run, a totalizer circuit or stepping motor 92 is connected with the output of both the gates 52 and 56. The stepping motor 92 is of the type which produces shaft rotation in the forward direction corresponding to the number of cycles of one input signal and produces shaft rotation in the forward direction corresponding to the number of cycles of the other input signal. It is noted that the stepping motor 92 is not provided with a reset circuit and thus the output shaft position is proportional to the total number of cycles of the timing signal which have occurred from the beginning of the test run. The stepping motor 92 drives a multi-turn linear potentiometer 94 to develop an output voltage $$\sum_{i=0}^{i=b} (m_i + n_i)$$

which is applied to the X axis input of the X—Y recorder 86.

In operation of the inventive apparatus, the acceleration data is recorded by the vehicle carried apparatus for any desired period of test. The data recorded by the two-channel tape recorder 12 includes the timing signal 48 produced by the oscillator 16 and the displacement signal 44 produced by the displacement signal generator 14. This acceleration data, as recorded on the magnetic tape 22 at the end of the test run, is reproduced by any suitable playback equipment including transducers 50 and 54. For each succeeding cycle of displacement signals, as represented by the first displacement increment $t0-t1$ and second displacement increment $t1-t2$, the computer, as previously described, operates to produce an acceleration signal voltage $$\left(\frac{1}{m+n}\right)\left(\frac{m-n}{mn}\right)$$

and to produce a total elapsed time signal voltage $$\sum_{i=0}^{i=b} (m_i + n_i)$$

The acceleration signal voltage and the elapsed time signal voltage are applied respectively to the Y axis input and the X axis input of the X—Y recorder 86 and for each succeeding cycle of displacement signal voltage there is developed an acceleration value corresponding to the elapsed time signal voltage value. Thus the recorder 86 produces a plot or curve 96 of acceleration value as a function of time, as shown in Figure 3.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

We claim:

1. A vehicle acceleration computer comprising a two-channel record medium having timing signals of known periodicity recorded on the first channel and first and second displacement signals of different character at the beginning of first and second predetermined increments of vehicle displacement recorded on the second channel, a first channel transducer responsive to said timing signal for developing a timing voltage, a second channel transducer responsive to said displacement signal for developing a displacement voltage, first and second cycle counting means, and switching means interposed between the first transducer and both of said cycle counting means for translating the timing voltage therebetween, said switching means being connected with the second transducer and being responsive to said displacement voltages for alternately translating said timing signal voltage to said first and second cycle counting means.

2. A vehicle acceleration computer comprising a two-channel record medium having timing signals of known periodicity recorded on the first channel and displacement signals of different character at the beginning of first and second predetermined increments of vehicle displacement recorded on the second channel, a first channel transducer responsive to said timing signal for developing a timing voltage, a second channel transducer responsive to said displacement signal for developing a displacement voltage, first and second switching means having their respective input circuits connected with the output circuit of the first transducer and having their respective control circuits connected with the output circuit of said second transducer, said first and second switching means being responsive to said displacement voltages for translating respectively the timing voltage corresponding to the first and second increments of displacement, and a combining circuit connected with the output circuits of said first and second switching means for developing an acceleration voltage in accordance with the relation:

$$\frac{1}{m+n} \cdot \frac{m-n}{mn}$$

where $m$ = the number of cycles of timing voltage occurring during the first increment of displacement.
$n$ = the number of cycles of timing voltage occurring during the second increment of displacement.

3. A vehicle acceleration computer comprising a two-channel record medium having timing signals of known periodicity recorded on the first channel and displacement signals of different character at the beginning of first and second predetermined increments of vehicle displacement recorded on the second channel, a first channel transducer responsive to said timing signal for developing a timing voltage, a second channel transducer responsive to said displacement signal for developing a displacement voltage, first and second switching means having their respective input circuits connected with the output circuit of the first transducer and having their respective control circuits connected with the output circuit of said second transducer, said first and second switching means being responsive to said displacement voltages for translating respectively the timing voltage corresponding to the first and second increments of displacement, a first combining circuit connected with the output circuits of said first and second switching means for developing an acceleration voltage in accordance with the relation:

$$\frac{1}{m+n} \cdot \frac{m-n}{mn}$$

where $m$ = the number of cycles of timing voltage occurring during the first increment of displacement.
$n$ = the number of cycles of timing voltage occurring during the second increment of displacement, and a second combining circuit connected with the output circuits of said first and second switching means for developing an elapsed time voltage in accordance with the relation:

$$1/f \sum_{i=0}^{i=b} m_i + n_i$$

where $f$ = timing signal frequency
$i$ = the number of the pairs of displacement increments
$b$ = the final number of the pairs of displacement increments, and an X—Y axis recorder connected with said combining circuits for recording acceleration as a function of time.

4. Apparatus for measuring and recording vehicle acceleration data comprising a recorder including first and second correlated recording channels each having a recording medium, a displacement responsive means on said vehicle for developing a signal at the beginning of each predetermined increment of displacement of said vehicle and connected with the first channel of the recorder to record a displacement signal on said medium, a timing signal means for developing a signal of known periodicity and connected with the second channel of the recorder to record a timing signal on said medium, a first channel transducer responsive to said displacement signal for developing a displacement voltage, a second channel transducer responsive to said timing signal for developing a timing voltage, first and second cycle counting means, and switching means interposed between the output of said second transducer and the input of both said cycle counting means, said switching means being connected with the output of said first transducer and being responsive to said displacement voltages for alternately applying said timing signal voltage to said first and second cycle counting means.

5. Apparatus for measuring vehicle acceleration data comprising a two-channel magnetic tape recorder, a displacement signal generator actuable by the drive train of a vehicle for developing displacement signals of different character at the beginning of first and second predetermined increments of vehicle displacement and connected to the input of the first channel of said recorder, and a timing signal generator connected to the input of the second channel of said recorder, a two-channel record medium for recording the timing signals on the first channel and for recording the displacement signals on the second channel, a first channel transducer responsive to the recorded timing signal for developing a timing voltage, a second channel transducer responsive to the recorded displacement signal for developing a displacement voltage, first and second switching means having their respective input circuits connected with the output circuit of the first transducer and having their respective control circuits connected with the output circuit of said second transducer, said first and second switching means being responsive to said displacement voltages for translating respectively the timing voltage corresponding to the first and second increments of displacement, and a combining circuit connected with the output circuits of said first and second switching means for developing an acceleration voltage in accordance with the relation:

$$\frac{1}{m+n} \cdot \frac{m-n}{mn}$$

where $m=$ the number of cycles of timing voltage occurring during the first increment of displacement.
$n=$ the number of cycles of timing voltage occurring during the second increment of displacement.

6. Apparatus for recording vehicle acceleration data comprising a recorder having two signal recording channels each coacting with a different channel of a single recording medium, displacement responsive means on said vehicle for developing a displacement signal of one polarity at the beginning of one predetermined increment of displacement and a signal of the opposite polarity at the beginning of the succeeding predetermined increment of displacement, said displacement signal means being connected to the input of the first channel of the recorder, and timing signal means for developing a timing signal of known periodicity connected to the input of the second channel of the recorder, a two-channel record medium having timing signals recorded on the first channel and displacement signals recorded on the second channel, a first channel transducer responsive to said timing signal for developing a timing voltage, a second channel transducer responsive to said displacement signal for developing a displacement voltage, first and second switching means having their respective input circuits connected with the output circuit of the first transducer and having their respective control circuits connected with the output circuit of said second transducer, said first and second switching means being responsive to said displacement voltages for translating respectively the timing voltage corresponding to the first and second increments of displacement, a first combining circuit connected with the output circuits of said first and second switching means for developing an acceleration voltage in accordance with the relation:

$$\frac{1}{m+n} \cdot \frac{m-n}{mn}$$

where $m=$ the number of cycles of timing voltage occurring during the first increment of displacement.
$n=$ the number of cycles of timing voltage occurring during the second increment of displacement, and a second combining circuit connected with the output circuits of said first and second switching means for developing an elapsed time voltage in accordance with the relation:

$$1/f \sum_{i=0}^{i=b} m_i + n_i$$

where $f=$ timing signal frequency
$i=$ the number of the pairs of displacement increments
$b=$ the final number of the pairs of displacement increments, and an X—Y axis recorder connected with said combining circuits for recording acceleration as a function of time.

References Cited in the file of this patent

UNITED STATES PATENTS

| | | |
|---|---|---|
| 2,229,324 | Gordon | Jan. 21, 1941 |
| 2,680,241 | Gridley | June 1, 1954 |
| 2,764,463 | Lubkin | Sept. 25, 1956 |
| 2,801,407 | Lubkin | June 30, 1957 |
| 2,877,415 | Rolle | Mar. 10, 1959 |

FOREIGN PATENTS

| | | |
|---|---|---|
| 750,787 | Great Britain | June 20, 1956 |